May 28, 1968   L. DI PIAZZA ET AL   3,385,148
MACHINE TOOL FOR CUTTING AN ASSEMBLY OF COAXIAL TUBES INTO
PARTS, PARTICULARLY THE CHANNELS OF A PRESSURE-TUBE
NUCLEAR REACTOR
Filed April 13, 1965   2 Sheets-Sheet 1
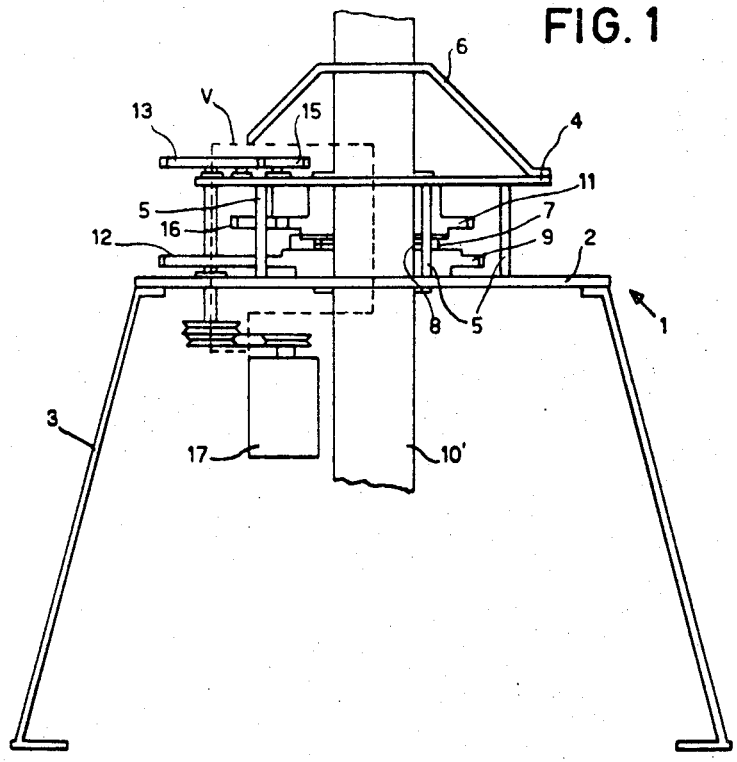
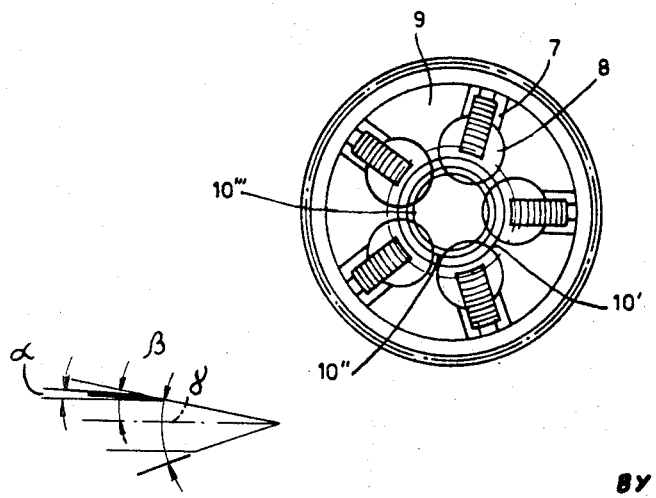
INVENTORS
Learço DI PIAZZA
René LEROY
Ermelino MONZANI
BY
ATTORNEYS INVENTORS
Learco DI PIAZZA
René LEROY
Ermelino MONZANI

ATTORNEYS

United States Patent Office 3,385,148
Patented May 28, 1968

3,385,148
MACHINE TOOL FOR CUTTING AN ASSEMBLY OF COAXIAL TUBES INTO PARTS, PARTICULARLY THE CHANNELS OF A PRESSURE-TUBE NUCLEAR REACTOR
Learco Di Piazza, Bodio, René Leroy, Comerico, and Ermelino Monzani, Milan, Italy, assignors to European Atomic Energy Community—Euratom, Brussels, Belgium
Filed Apr. 13, 1965, Ser. No. 447,717
Claims priority, application Belgium, Apr. 16, 1964, 519,192
5 Claims. (Cl. 82—70.2)

The present invention relates to a cutting-wheel machine tool for cutting into parts the assembly of coaxial tubes and it is particularly adapted, although not exclusively so for cutting operations in a nuclear installation such as a pressure-tube nuclear reactor.

As is known, in certainn types of reactors moderated with heavy water and cooled by an organic liquid, an arrangement of the refrigerant channels has been proposed which is characterized by an assembly of several concentric tubes, the outer one of which intended to resist the pressure of the refrigerant being called the pressure-tube. At various levels along such a channel, there is a single tube or two or three coaxial tubes, not counting the fuel element which is mounted inside these tubes. Also, the materials of the tubes being different, different materials are met from one level to the other.

In fact, in the specific case of the reactor in question, the following materials are met at different levels:

Stainless steel type 18/8
Allied steel, type Z30–C13
Sintered aluminium containing high percentages of alumina and known under the sigla S.A.P. (sintered aluminium powder)
Zirconium alloy of the type called Zircalloy 2
Aluminium type A5NET
Aluminium alloy, type AG3NET, known under the name Duralinox.

Furthermore, the tubes which have a thickness in the order of 2 mm. are arranged one within the other with a free spacing, that is, bracing of the tubes is provided only at the ends thereof or they are solid with the tank of the moderator.

Besides, if the refrigerant that passes through the free spaces between the tubes is a mixture of terphenyls, there is a danger that in the case of a fault in the circulation of the refrigerant fluid, frozen terphenyl may be found between two concentric tubes.

The necessity to section the cooling channel, formed of such a plurality of tubes and of such materials, in order to be able to remove therefrom a fuel element that has become jammed following an accident, has presented to the technicians the problem of the choice of a cutting machine capable of overcoming the following difficulties:

having a multi-purpose cutting tool capable of cutting different materials,
adapting thereto the cutting fluid and limiting the sure contamination thereof,
overcoming the wear of the tool and the resharpening problems,
perfectly circumscribing the zone where the chips fall,
solidly joining the concentric tubes together, and avoiding burning of the chips of inflammable materials, such as the Zircalloy.

According to the invention, machine-tool for cutting an assembly of concentric tubes and capable of eliminating the aforementioned drawbacks is characterized by the fact that it comprises at least three cutting wheels or discs the upper plane of which has a slight incline up to the bevelled edge of the wheel, the bevel having a still more pronounced incline in relation to the horizontal plane, preferably of an angle of 10°, the cutting discs being distributed equidistantly on a circle around the floating tubes and driven into a radial forward displacement.

The cutting-disc tool is indeed suitable for different materials, it does not produce any chips, it does not require cutting fluid, it does not produce overheating and it does not require sharpening.

By a circular equidistant arrangement of several cutting-discs of a particular type which makes them self-centering, the rigidity of the concentric tubes is no longer important.

The sectioning machine of the invention is further characterized in that the cutting-disc supports are mounted circularly equidistantly on a first annular rotary plate through which the tubes to be sectioned extend, the disc supports being kinematically connected to elements responsible for the radial displacement of the discs.

More specifically, the disc supports are guided into grooves in the first rotary plate and kinematically engaged in a flat Archimedean screw which is part of a second rotary plate similar to and facing the first plate. A set of pinions coupled to the said plates ensures a different number of turns for the two plates and causes radial displacement of the disc supports. The cutting-discs are mounted on the machine in the radial plane of the tubes to be sectioned.

In this manner, self-centering of the tubes is obtained as well as a continuous application of the cutting-discs.

A non-limitative embodiment of a sectioning-machine will now be described with reference to the appended drawings wherein:

FIG. 1 is a diagrammatic side elevation view of the simplified mechanical arrangement of the machine;

FIG. 2 is a diagrammatic plan view of the essential members of the machine;

FIGS. 4a and 4b are transverse cross-sectional views of a cutting-disc; and

Figure 4A:

Referring first to FIGS. 1 and 2, there is shown the body 1 of the sectioning-machine, the lower table 2 supporting the tools and mounted on four legs 3, the upper table 4 fixed to the lower table 2 by means of braces and a yoke 6 for guiding the assembly of tubes to be sectioned.

According to the invention, five cutting-tool units are mounted on a first annular rotary plate 9 through which the coaxial tubes 10', 10" and 10''' (see FIG. 2) to be sectioned extend. Each unit is constituted by a cutting-disc support or disc-carrier 7 and the self-centering cutting-disc 8 proper having a cutting edge.

The disc-carriers 7 are kinematically coupled to members intended to cause the necessary forward and rearward radial displacement of the discs.

Figure 3:
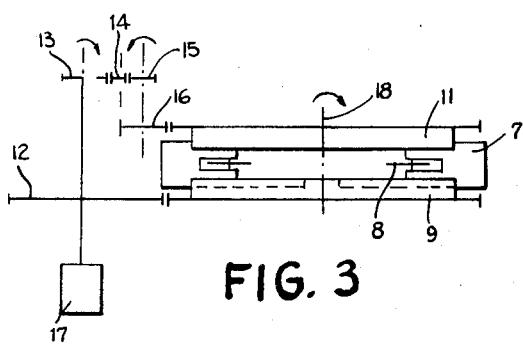
FIG. 3 is a kinematic diagram of the machine.

These members, as shown in FIG. 3, comprise a second rotary plate 11 similar to and disposed in front of the first plate 9 and the set of pinions 12–16 with the driving motor 17.

It is pointed out that pinion 13 is interchangeable with pinions having a different number of teeth and that pinion 14 is only an auxiliary wheel for reversing the direction of rotation so that plates 9 and 11 rotate in the same direction.

Pinion 14 is adjustably mounted on the frame of the machine to be able to adapt the set of pinions to the specific pinion that has been chosen as pinion 13.

The disc-carriers 7 are in double engagement in this kinematic drive, that is, by their lower part they are guided in radial grooves of the first plate 9 whereas by their upper part (see FIG. 2) they mesh with an Archimedean flat screw on the lower face of the second plate 11. When the pinion assembly 12 to 16 displaces plates 9 and 11 (the latter carry teeth at the periphery) the discs-carriers, because of the different rotary speeds, of the plates, are displaced radially (either toward the axes of symmetry 18 of the machine or away therefrom).

As will be gathered from FIG. 4, the discs have a particular geometrical shape, designed from practical experiments, which makes it possible to obtain self-centering of the tubes and a constant application of the discs themselves on the tubes.

Indeed, if flat cutting-discs were used, the tubes which are never neither accurately centered nor accurately cylindrical would only be partially cut and the disc entering into the cut part would not offer any reaction to the discs still in action, the tube would then tend to be displaced in the cutting plane which would prevent the complete sectioning thereof. In order to overcome this drawback, the cutting-discs are provided with an inclined face which makes it possible to continuously provide a reaction even when the tube is partially cut. This incline must not however be too steep in order to avoid the creation of a vertical reaction which would tend to lift the tube and undesirably increase the power necessary for the sectioning operation. Experimentally, an angle of 2° up to the bevelled edge and an angle of 10° for the bevelled edge itself have been adopted; these angles are indicated by $\alpha$ and $\beta$ on FIG. 4. Angle $\gamma$ has a value of 30°.

The dimensions of the cutting-discs used were as follows: diameter 90 mm.; thickness 5.5 mm.; width of the upper bevelled edge 10 mm.; width of the lower bevelled edge 5 mm.; radius of the tip of the edge 0.2 mm. The cutting-discs were made of tool steel, chromium, of high hardness, wear resistant, trademark "Cogne" type SOR 2/HCS.

Figure 5:
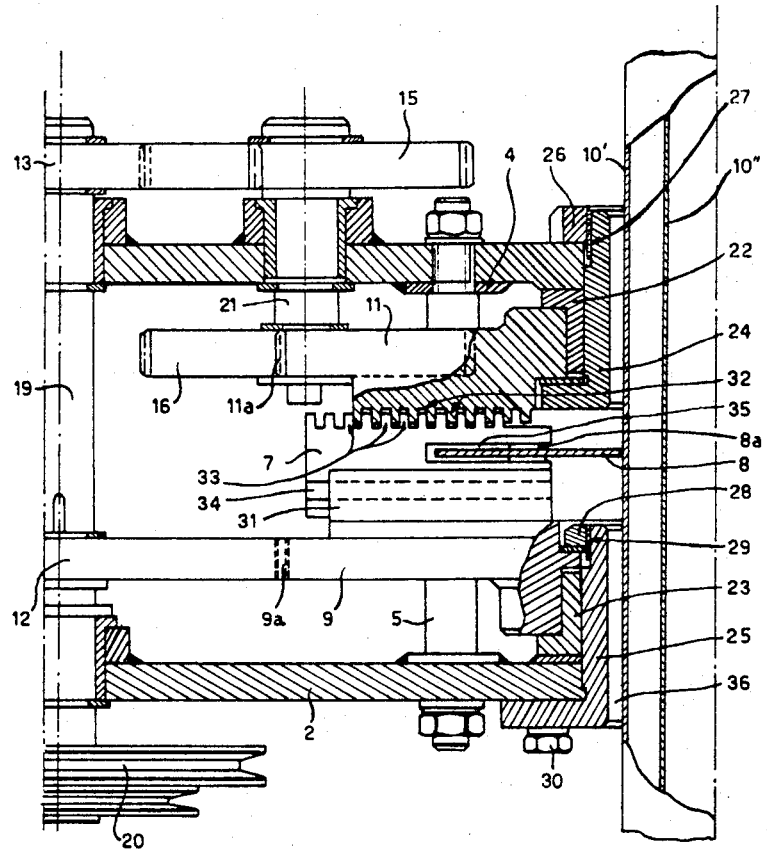
FIG. 5 is a vertical cross-sectional view of one half of the machine, the latter being in oblique position on an assembly of coaxial tubes.

Referring now to FIG. 5, the specific elements of the machine as well as its operation will now be described. FIG. 5 illustrates the portion of FIG. 1 which is circumscribed by the line V.

In FIG. 5 is again seen the set of pinions 12 to 16, the rotary plates 9 and 11, a disc-carrier 7 (self-centering jaws), tables 2 and 4 of the frame of the machine, braces 5 in the form of bolts and tubes 10', 10" to be sectioned.

The set of pinions is mainly constituted by two propelling systems, namely a shaft 19 with driving pulley, with pinion 12 at the bottom and with pinion 13 at the top and a transmission shaft 21 with pinion 15 at the top and pinion 16 at the bottom. Auxiliary pinion 14 of FIG. 3 is not visible.

The rotary plates 9 and 11 provided with teeth 9a and 11a are housed and freely retained between corresponding radial shoulders of cylindrical sleeves 22 and 23 and sleeves 24 and 25 in the annular space of the plates. Sleeves 24 and 25, which serve as a support for sleeves 22 and 23, are secured to the tables 4 and 2 of the frame, respectively, that is the upper sleeve is made solid with table 4 at the top by means of a nut 26. For this purpose, sleeve 24 has a corresponding threading 27. Table 4 is held in place by the aforementioned bolts 5. By acting on screw 26, it is possible to adjust the seat of the rotary disc 11 between sleeves 22 and 24.

The lower rotary plate 9 is also secured in position by a nut 28, screwed on thread 29 of the corresponding sleeve 25. This sleeve is made solid with the lower disc 2 of the body through screws 30.

The lower plate 9 carries on its upper surface shoulders 31 having opposed radially directed guiding grooves for the reception of the cutting-disc carriers 7 through the lower part thereof; the upper plate 11 has an Archimedean screw 32 on the lower surface thereof for the guiding of the cutting-disc carrier through the upper portion thereof.

The disc-carriers 7 then have at the top thereof teeth 33 in the form and of the pitch of the Archimedean screw; in their lower part, they are formed with a dovetail projection 34.

In order to secure the cutting-discs 8, an opening 35 is machined in the body of each disc-carrier. The axes 8a of the disc is secured in vertical position between the jaws of this opening in such a manner that they are freely rotatable.

Rotation of the lower plate 9 alone creates the orbital displacement of the discs around the tubes to be sectioned and rotation of the discs proper. The simultaneous but differed rotation of the upper plate 11, in the same direction, ensures the radial displacement of the discs.

Operation of the machine of the invention is as follows:

The assembly of the tubes to be sectioned is introduced vertically and loosely in the bore 36 of the machine until the desired level is reached. Securement of the upper part is achieved for example by the guiding yoke 6, if this cannot be obtained by means of its very weight. Motor 17 is then driven into rotation to produce displacement of the discs towards the tubes to be sectioned. In practice, a forward movement of 0.028 mm. per turn has been adopted by using an appropriate pinion 13 in the pinion train above-mentioned. Sectioning then takes place without difficulty and rapidly.

The cuts thus obtained, even for a thickness of tubes of 0.6 mm. only, are clean, without deformation of the tubes and more important without the creation of chips.

At the end of the sectioning operation, the cutting-discs are freed from the tubes by rapid displacement of the discs-carriers. For this purpose, the lower plate is locked and the upper plate alone is driven in a direction reverse that of the initial rotation.

By way of example, a kinematic drive for a machine with central bore of 15 cm. is characterized by the following ratios (in number of teeth): pinion 12: 86 teeth; pinion 13: 85 teeth; pinion 14: 40 teeth; pinion 15: 64 teeth; pinion 16: 65 teeth; teething of plates 9 and 11: 190 teeth. The pitch of the Archimedean is 7.25 mm. The speed of the upper plate: 50 r.p.m. The power of the 220 volts A.C. electric driving motor: 3.5 H.P.

We claim:

1. A cutting machine for sectioning tubes coaxially and loosely mounted one into the other, comprising:
   (a) at least three generally horizontal cutting discs each having an upper face and a cutting bevelled edge; said upper face declining slightly from the center thereof toward said bevelled edge in relation to the horizontal plane and said edge declining more sharply than said upper face in relation to said plane;
   (b) means mounting said cutting discs equidistantly around said tubes, and
   (c) means causing radial displacement of said discs in relation to said tubes.

2. A cutting machine as claimed in claim 1, wherein the bevelled edge incline is of the order of 10°.

3. A cutting machine as claimed in claim 1, wherein said mounting means includes a first rotary annular plate mounted around said tubes and disc-carriers evenly distributed on said first plate and in kinematic engagement with said displacement means.

4. A cutting machine as claimed in claim 2, wherein said disc-carriers are guided into radially directed grooves on said first plate and said displacement means comprises:
- a second annular rotary plate mounted above the first plate;
- Archimedean screw means on said second plate and said disc-carriers capable of causing axial displacement of the carriers, and
- means to cause relative rotation of said first and second plates to produce radial displacement of said carriers and discs relative to said tubes to be sectioned.

5. A cutting machine as claimed in claim 4, including a pair of spaced upper and lower tables having a bore through the center thereof for the passage of the tubes to be sectioned; means to secure said tubes to said tables, and means to mount said plates between said tables.

No references cited.

HARRISON L. HINSON, *Primary Examiner.*